(12) United States Patent
Ono (10) Patent No.: US 11,909,002 B2
(45) Date of Patent: Feb. 20, 2024

(54) NON-AQUEOUS ELECTROLYTE SECONDARY BATTERY

(71) Applicant: Prime Planet Energy & Solutions, Inc., Tokyo (JP)

(72) Inventor: Masato Ono, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 210 days.

(21) Appl. No.: 17/496,006

(22) Filed: Oct. 7, 2021

(65) Prior Publication Data

US 2022/0115708 A1 Apr. 14, 2022

(30) Foreign Application Priority Data

Oct. 9, 2020 (JP) .................. 2020-170844

(51) Int. Cl.
*H01M 10/0585* (2010.01)
*H01M 4/02* (2006.01)

(52) U.S. Cl.
CPC .. *H01M 10/0585* (2013.01); *H01M 2004/027* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0147724 A1* | 5/2014 | Kim | ...................... | H01M 50/46 429/131 |
| 2014/0212729 A1* | 7/2014 | Park | ................... | H01M 50/457 429/246 |
| 2018/0254474 A1* | 9/2018 | Izumi | ................ | H01M 10/0525 |
| 2019/0221808 A1* | 7/2019 | Honda | .............. | H01M 10/0525 |
| 2021/0242538 A1 | 8/2021 | Lee et al. | | |

FOREIGN PATENT DOCUMENTS

| | | | | |
|---|---|---|---|---|
| JP | 201438801 | A | | 2/2014 |
| JP | 6093369 | B2 | | 3/2017 |
| KR | 20170094713 | A | * | 8/2017 |
| KR | 1020190140681 | A | | 12/2019 |

OTHER PUBLICATIONS

English language machine translation of KR-20170094713-A. (Year: 2023).*

* cited by examiner

*Primary Examiner* — Eli S Mekhlin
(74) *Attorney, Agent, or Firm* — HAUPTMAN HAM, LLP (57) ABSTRACT

The non-aqueous electrolyte secondary battery disclosed herein includes the laminated electrode body having cell units in each of which a first electrode, a first separator, a second electrode, and a second separator are stacked. The first electrode has a first active material layer, and the second electrode has a second active material layer. A facing area which faces the second active material layer is formed in a central portion of the first active material layer. The first separator and the first electrode are bonded to each other by a first adhesive, and the first adhesive is not disposed in the facing area and is disposed in an area other than the facing area. The first separator and the second separator are not bonded to the second active material layer, and are joined to each other outside the second electrode.

8 Claims, 3 Drawing Sheets

NON-AQUEOUS ELECTROLYTE SECONDARY BATTERY

BACKGROUND OF THE INVENTION

1. Field of the Invention

The present disclosure relates to a non-aqueous electrolyte secondary battery. The present application claims priority based on Japanese Patent Application No. 2020-170844 filed on Oct. 9, 2020, the entire contents of which are incorporated herein by reference in its entirety.

2. Description of the Related Art

In recent years, a non-aqueous electrolyte secondary battery such as a lithium secondary battery is suitably used as a portable power source for a personal computer or a cellular phone, or a power source for driving a vehicle such as an electric vehicle (EV), a hybrid vehicle (HV), and a plug-in hybrid vehicle (PHV).

A typical non-aqueous electrolyte secondary battery includes an electrode body in which a positive electrode and a negative electrode are stacked via a separator. The electrode body is roughly classified into a wound electrode body and a laminated electrode body. The laminated electrode body has a structure in which positive electrodes and negative electrodes are alternately stacked via separators.

As one of manufacturing methods of the laminated electrode body, there is a method in which, after a plurality of mono-cells, in each of which a first electrode, a first separator, a second electrode, and a second separator are stacked in this order, are formed, the plurality of mono-cells are further stacked (see, e.g., the specification of Japanese Patent No. 6093369). In such a manufacturing method, in order to prevent a misalignment between the electrode and the separator, the separator and the electrode are bonded to each other by an adhesive. For example, the specification of Japanese Patent No. 6093369 describes that, for bonding the separator to the electrode with the adhesive, both surfaces of the first separator are coated with the adhesive, and only a surface of the second separator that faces the second electrode is coated with the adhesive.

SUMMARY OF THE INVENTION

However, in the conventional art, it becomes difficult for a non-aqueous electrolyte solution (particularly a charge carrier (e.g., a lithium ion or the like)) to move in a portion of the separator coated with the adhesive, and this may cause deterioration of resistance properties. In addition, in the portion of the separator coated with the adhesive, it becomes difficult for the non-aqueous electrolyte solution to flow. Consequently, a problem arises in that, during manufacture of the non-aqueous electrolyte secondary battery, time required for the non-aqueous electrolyte solution to penetrate the electrode body is increased, and productivity is significantly reduced.

To cope with this, an object of the present disclosure is to provide a non-aqueous electrolyte secondary battery having excellent resistance properties and excellent penetrability of a non-aqueous electrolyte solution into a laminated electrode body during manufacture.

A non-aqueous electrolyte secondary battery disclosed herein includes a laminated electrode body in which two or more cell units, in each of which a first electrode, a first separator, a second electrode, and a second separator are stacked in this order, are stacked, and a non-aqueous electrolyte solution. The first electrode has a first current collector and a first active material layer. The second electrode has a second current collector and a second active material layer. An area of a principal surface of the first active material layer of the first electrode is larger than an area of a principal surface of the second active material layer of the second electrode. Each of an area of a principal surface of the first separator and an area of a principal surface of the second separator is larger than the area of the principal surface of the second active material layer of the second electrode. A facing area which faces the second active material layer is formed in a central portion of the first active material layer. A non-facing area which does not face the second active material layer is formed in an outer peripheral edge portion of the first active material layer. The first separator and the first electrode are bonded to each other by a first adhesive. The first adhesive which bonds the first electrode to the first separator is not disposed in the facing area of the first active material layer and is disposed in an area other than the facing area. The first separator and the second separator are not bonded to the second active material layer of the second electrode. The first separator and the second separator are joined to each other outside the second electrode. According to this configuration, there is provided the non-aqueous electrolyte secondary battery having excellent resistance properties and excellent penetrability of the non-aqueous electrolyte solution into the laminated electrode body during manufacture.

In a desired aspect of the non-aqueous electrolyte secondary battery disclosed herein, the first electrode is a negative electrode, and the second electrode is a positive electrode. According to this configuration, the area of the principal surface of the negative electrode active material layer is larger than the area of the principal surface of the positive electrode active material layer, and hence it is possible to prevent an ion functioning as a charge carrier (e.g., a lithium ion or the like) from being deposited as metal at a high level.

In a desired aspect of the non-aqueous electrolyte secondary battery disclosed herein, the second current collector has a protrusion portion which protrudes from a multilayer portion of the first active material layer and the second active material layer, and the protrusion portion is bonded to at least one of the first separator and the second separator. According to this configuration, it is possible to prevent positional displacement of the second electrode at a high level.

In a desired aspect of the non-aqueous electrolyte secondary battery disclosed herein, in at least a part of the non-facing area in the outer peripheral edge portion of the first active material layer, the first adhesive is not disposed, and a path through which the non-aqueous electrolyte solution flows is formed. According to this configuration, the penetrability of the non-aqueous electrolyte solution into the laminated electrode body during manufacture is more excellent.

In a desired aspect of the non-aqueous electrolyte secondary battery disclosed herein, a thickness of the first adhesive is smaller than a thickness of the second electrode. According to this configuration, it is possible to avoid concentration of stress on a portion in which the first adhesive is disposed when the cell units are stacked.

In a desired aspect of the non-aqueous electrolyte secondary battery disclosed herein, in two of the cell units which are positioned adjacent to each other, the first electrode of one of the cell units and the second separator of the other of the cell units are bonded to each other. According to this configuration, it is possible to prevent a misalignment between the cell units.

In a further desired aspect of the non-aqueous electrolyte secondary battery disclosed herein, a facing area which faces the second active material layer of the second electrode of the other of the cell units is formed in a central portion of the first active material layer of the first electrode of the one of the cell units. A non-facing area which does not face the second active material layer of the second electrode of the other of the cell units is formed in an outer peripheral edge portion of the first active material layer of the first electrode of the one of the cell units. The first electrode of the one of the cell units and the second separator of the other of the cell units are bonded to each other by a third adhesive. The third adhesive is not disposed in the facing area of the first active material layer of the first electrode of the one of the cell units and is disposed in an area other than the facing area. In at least a part of the non-facing area, the third adhesive is not disposed and a path through which the non-aqueous electrolyte solution flows is formed. According to this configuration, the penetrability of the non-aqueous electrolyte solution into the laminated electrode body during manufacture is more excellent while the misalignment between the cell units is prevented.

In a desired aspect of the non-aqueous electrolyte secondary battery disclosed herein, the laminated electrode body includes a multilayer body in which a plurality of the cell units are stacked and of which outermost layers are a positive electrode and a negative electrode, and a single negative electrode. The single negative electrode is stacked on the positive electrode which is the outermost layer of the multilayer body. According to this configuration, it is possible to use lithium in the positive electrode which is the outermost layer for charge and discharge, and it is possible to improve cell capacity.

DESCRIPTION OF THE PREFERRED EMBODIMENTS

Hereinbelow, an embodiment according to the present disclosure will be described with reference to the drawings. It should be noted that matters which are not specifically mentioned in the present specification and are necessary for implementation of the present disclosure can be understood as design matters of those skilled in the art based on the conventional art in the field. The present disclosure can be implemented based on contents disclosed in the present specification and common general technical knowledge in the field. In addition, in the following drawings, members and portions which have the same functions are designated by the same reference numerals, and the description thereof is made. Further, the dimensional relationship (length, width, thickness, and the like) in the individual drawings may not necessarily reflect the actual dimensional relationship.

Hereinbelow, the present embodiment will be described in detail by using a lithium ion secondary battery as an example. It should be noted that, in the present specification, a "secondary battery" denotes a storage device which can be charged and discharged repeatedly, and is a term which includes a so-called storage battery and a storage element such as an electric double layer capacitor. In addition, in the present specification, a "lithium secondary battery" denotes a secondary battery in which a lithium ion is used as a charge carrier and charge and discharge are implemented by movement of a charge by the lithium ion between positive and negative electrodes.

Figure 1:
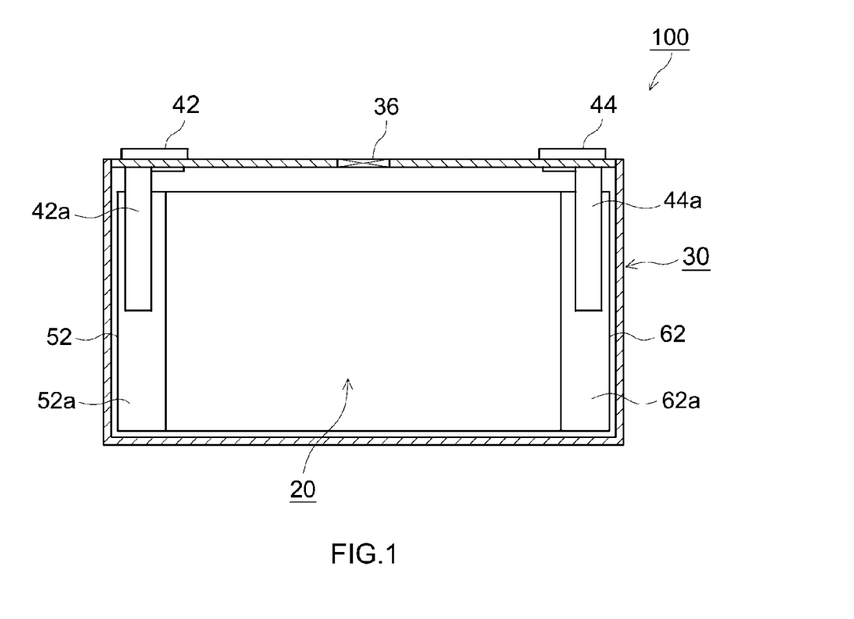
FIG. 1 is a cross-sectional view schematically showing an internal structure of a lithium ion secondary battery according to an embodiment of the present disclosure.

FIG. 1 schematically shows an internal structure of a lithium ion secondary battery 100 according to the present embodiment. The lithium ion secondary battery 100 shown in FIG. 1 includes a laminated electrode body 20, a non-aqueous electrolyte solution (not shown), and a square battery case 30 which accommodates the laminated electrode body 20 and the non-aqueous electrolyte solution. The battery case 30 is sealed. Therefore, the lithium ion secondary battery 100 is a sealed battery.

As shown in FIG. 1, the battery case 30 is provided with a positive electrode terminal 42 and a negative electrode terminal 44 for external connection, and a thin safety valve 36 which is set such that, in the case where internal pressure of the battery case 30 rises to a level equal to or higher than a predetermined level, the internal pressure is released. In addition, the battery case 30 is provided with an injection port (not shown) for injecting a non-aqueous electrolyte. The positive electrode terminal 42 is electrically connected to a positive electrode current collector plate 42a. The negative electrode terminal 44 is electrically connected to a negative electrode current collector plate 44a.

As the material of the battery case 30, a metal material such as aluminum is used due to its light weight and high thermal conductivity. However, the material of the battery case 30 is not limited thereto, and the battery case 30 may also be made of resin. In addition, the battery case 30 may also be a laminate case which uses a laminate film.

Figure 2:
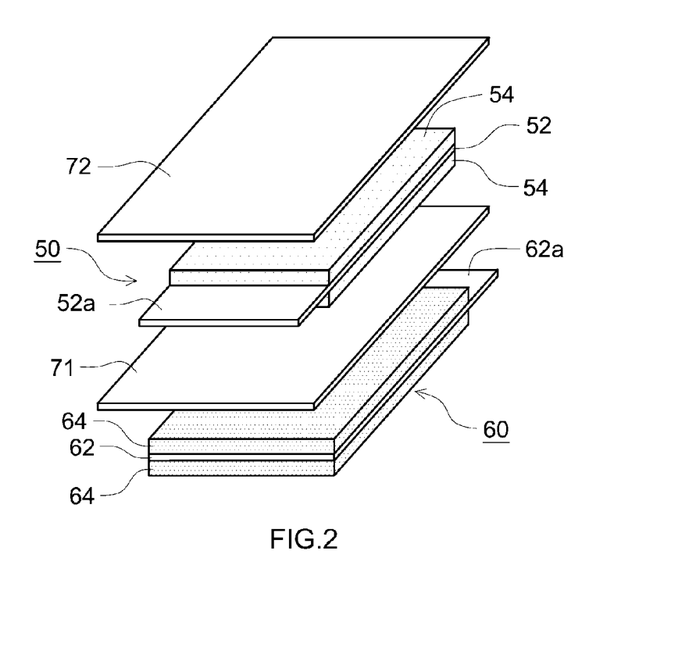
FIG. 2 is an exploded perspective view schematically showing a cell unit included in a laminated electrode body of the lithium ion secondary battery according to the embodiment of the present disclosure.

FIG. 2 schematically shows a cell unit 10 which constitutes the laminated electrode body 20. FIG. 2 is an exploded perspective view. The laminated electrode body 20 has two or more cell units 10 shown in the drawing. Two or more cell units are stacked, and the laminated electrode body 20 is thereby constituted. The number of cell units 10 of the laminated electrode body 20 is not particularly limited, and may be equal to the number of cell units of a laminated electrode body used in a conventional lithium ion secondary battery. The number of cell units 10 of the laminated electrode body 20 is, e.g., not less than 2 and not more than 150, and is desirably not less than 20 and not more than 100.

As shown in FIG. 2, the cell unit 10 has a negative electrode 60 serving as a first electrode, a separator 71 serving as a first separator, a positive electrode 50 serving as a second electrode, and a separator 72 serving as a second separator. In the cell unit 10, the negative electrode 60, the separator 71, the positive electrode 50, and the separator 72 are stacked in this order.

The positive electrode 50 has a positive electrode current collector 52, and a positive electrode active material layer 54 provided on the positive electrode current collector 52. As shown in FIG. 2, in the present embodiment, the positive electrode active material layers 54 are provided on both surfaces of the positive electrode current collector 52. However, the positive electrode active material layer 54 may also be provided only on one surface of the positive electrode current collector 52. At one end portion of the positive electrode 50, there is provided a positive electrode active material layer non-formation portion 52a which is a portion in which the positive electrode active material layer 54 is not formed and the positive electrode current collector 52 is exposed. A tape for insulation or an insulating coat layer containing alumina or boehmite may be provided in part of the positive electrode active material layer non-formation portion 52a.

The negative electrode 60 has a negative electrode current collector 62, and a negative electrode active material layer 64 provided on the negative electrode current collector 62. As shown in FIG. 2, in the present embodiment, the negative electrode active material layers 64 are provided on both surfaces of the negative electrode current collector 62. However, the negative electrode active material layer 64 may also be provided only on one surface of the negative electrode current collector 62. At one end portion of the negative electrode 60, there is provided a negative electrode active material layer non-formation portion 62a which is a portion in which the negative electrode active material layer 64 is not formed and the negative electrode current collector 62 is exposed.

As shown in FIG. 1 and FIG. 2, the positive electrode active material layer non-formation portion 52a and the negative electrode active material layer non-formation portion 62a protrude in mutually opposite directions from multilayer portions of the positive electrode active material layers 54 and the negative electrode active material layers 64. Each of the positive electrode active material layer non-formation portion 52a and the negative electrode active material layer non-formation portion 62a functions as a current collector tab. The shape of each of the positive electrode active material layer non-formation portion 52a and the negative electrode active material layer non-formation portion 62a is not limited to that shown in the drawing, and may also be formed into a predetermined shape by cutting or the like. The protrusion directions of the positive electrode active material layer non-formation portion 52a and the negative electrode active material layer non-formation portion 62a are not limited to those shown in the drawing. The positive electrode active material layer non-formation portion 52a and the negative electrode active material layer non-formation portion 62a may be provided at positions which do not allow the portions to overlap each other and formed into shapes which do not allow the portions to overlap each other, and may protrude in the same direction.

In the laminated electrode body 20, the positive electrode active material layer non-formation portions 52a of a plurality of the cell units 10 are brought together and are electrically joined to the positive electrode current collector plate 42a, as shown in FIG. 1. The negative electrode active material layer non-formation portions 62a of the plurality of the cell units 10 are brought together and are electrically joined to the negative electrode current collector plate 44a, as shown in FIG. 1. Each joining is performed by, e.g., ultrasonic welding, resistance welding, or laser welding.

As the positive electrode current collector 52, it is possible to use a sheet-shaped or foil-like member made of metal having excellent conductivity (e.g., aluminum, nickel, titanium, and stainless steel), and aluminum foil or the like is suitably used. The thickness of the positive electrode current collector 52 is not particularly limited, and is, for example, 5 μm to 35 μm and is desirably 7 μm to 20 μm.

The positive electrode active material layer 54 contains at least a positive electrode active material. Examples of the positive electrode active material include lithium transition metal composite oxides such as lithium nickel cobalt manganese composite oxides (e.g., $LiNi_{1/3}Co_{1/3}Mn_{1/3}O_2$ and the like), lithium nickel composite oxides (e.g., $LiNiO_2$ and the like), lithium cobalt composite oxides (e.g., $LiCoO_2$ and the like), and lithium nickel manganese composite oxides (e.g., $LiNi_{0.5}Mn_{1.5}O_4$ and the like). The positive electrode active material layer 54 can further contain a conductive material and a binder. As the conductive material, for example, carbon black such as acetylene black (AB) and other carbon materials (graphite and the like) can be used. As the binder, for example, polyvinylidene fluoride (PVDF) or the like can be used. The thickness of the positive electrode active material layer 54 is not particularly limited, and is, for example, 20 μm to 300 μm.

As the negative electrode current collector 62, it is possible to use a sheet-shaped or foil-like member made of metal having excellent conductivity (e.g., copper, nickel, titanium, and stainless steel), and copper foil is suitably used. The thickness of the negative electrode current collector 62 is, for example, 5 μm to 35 μm, and is desirably 7 μm to 20 μm.

The negative electrode active material layer 64 contains at least a negative electrode active material. Examples of the negative electrode active material include carbon materials such as graphite, hard carbon, and soft carbon. The negative electrode active material layer 64 can further contain a binder and a thickening agent. As the binder, for example, styrene butadiene rubber (SBR) or the like can be used. As the thickening agent, for example, carboxymethyl cellulose (CMC) or the like can be used. The thickness of the negative electrode active material layer 64 is not particularly limited, and is, for example, 20 μm to 300 μm.

As each of the separator 71 and the separator 72, it is possible to use various porous sheets identical to those conventionally used in a lithium ion secondary battery, and an example thereof includes a porous resin sheet made of polyolefin such as polyethylene (PE) or polypropylene (PP). Such a porous resin sheet may have a single layer structure or may also have a multilayer structure having two or more layers (e.g., a three-layer structure in which PP layers are stacked on both surfaces of a PE layer). Each of the separator 71 and the separator 72 may include a heat-resistant layer (HRL). The thickness of each of the separator 71 and the separator 72 is not particularly limited, and is, for example, 10 μm to 40 μm In the present embodiment, the area of a principal surface of the negative electrode active material layer 64 of the negative electrode 60 is larger than the area of a principal surface of the positive electrode active material layer 54 of the positive electrode 50. At this point, it is possible to prevent a lithium ion from being deposited as metallic lithium at a high level. It should be noted that the principal surface of the active material layer means, among surfaces constituting the active material layer, a surface having the largest area. Therefore, in the present embodiment, the principal surface of the negative electrode active material layer 64 denotes a surface which is in contact with the negative electrode current collector 62, and a surface which faces the above surface. In addition, the principal surface of the positive electrode active material layer 54 denotes a surface which is in contact with the positive electrode current collector 52, and a surface which faces the above surface. On the other hand, from the viewpoint of insulation properties, the area of a principal surface of each of the separator 71 and the separator 72 is larger than the area of the principal surface of the negative electrode active material layer 64 of the negative electrode 60, and is larger than the area of the principal surface of the positive electrode active material layer 54 of the positive electrode 50. It should be noted that the principal surface of the separator means, among surfaces constituting the separator, a surface having the largest area.

Figure 3:
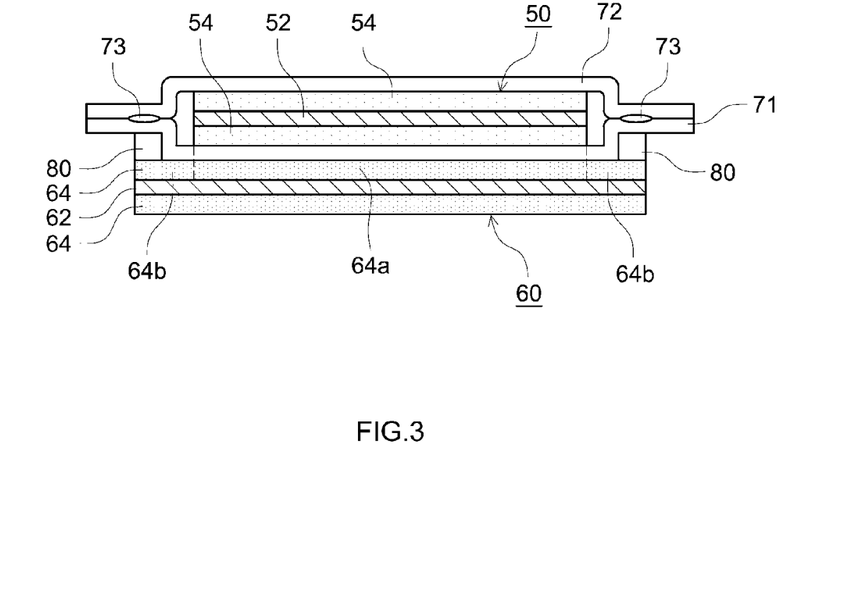
FIG. 3 is a cross-sectional view schematically showing the cell unit included in the laminated electrode body of the lithium ion secondary battery according to the embodiment of the present disclosure.
Figure 4:
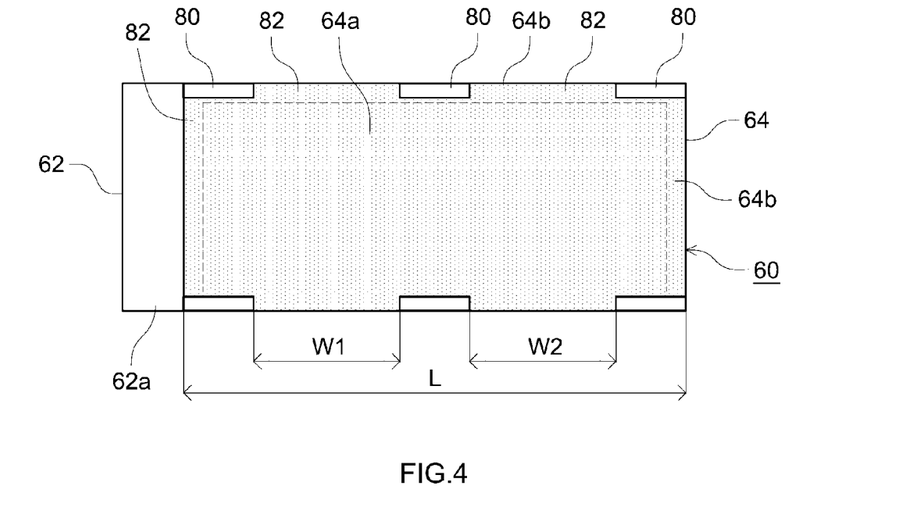
FIG. 4 is a schematic view of a negative electrode of the cell unit included in the laminated electrode body of the lithium ion secondary battery according to the embodiment of the present disclosure.

FIG. 3 shows a cross-sectional view of the cell unit 10. FIG. 3 is a cross-sectional view along a width direction (a left-right direction in FIG. 2) of the cell unit 10 and a stacking direction of the positive electrode 50 and the negative electrode 60. FIG. 4 shows the negative electrode 60 included in the cell unit 10. FIG. 4 is a view along a principal surface direction of the negative electrode 60. As shown in FIG. 3 and FIG. 4, a facing area 64a which faces the positive electrode active material layer 54 is formed in a central portion of the negative electrode active material layer 64. In addition, a non-facing area 64b which does not face the positive electrode active material layer 54 is formed in an outer peripheral edge portion of the negative electrode active material layer 64.

As shown in FIG. 3 and FIG. 4, the separator 71 and the negative electrode 60 are bonded to each other by a first adhesive 80. The first adhesive 80 is disposed outside the facing area 64a of the negative electrode active material layer 64. Specifically, the first adhesive 80 is disposed in the non-facing area 64b of the negative electrode active material layer 64. On the other hand, the first adhesive 80 is not disposed in the facing area 64a of the negative electrode active material layer 64. It should be noted that the depiction of the first adhesive 80 is omitted in FIG. 2.

As the first adhesive 80, it is possible to use, for example, a hot melt adhesive, an ultraviolet-curing adhesive, or a thermosetting adhesive.

In an example shown in FIG. 4, the first adhesive 80 is not disposed in at least a part of the non-facing area 64b of the negative electrode active material layer 64. However, the placement of the first adhesive 80 is not limited thereto. The first adhesive 80 may also be disposed in the entire non-facing area 64b of the negative electrode active material layer 64 without any gap.

Figure 5:
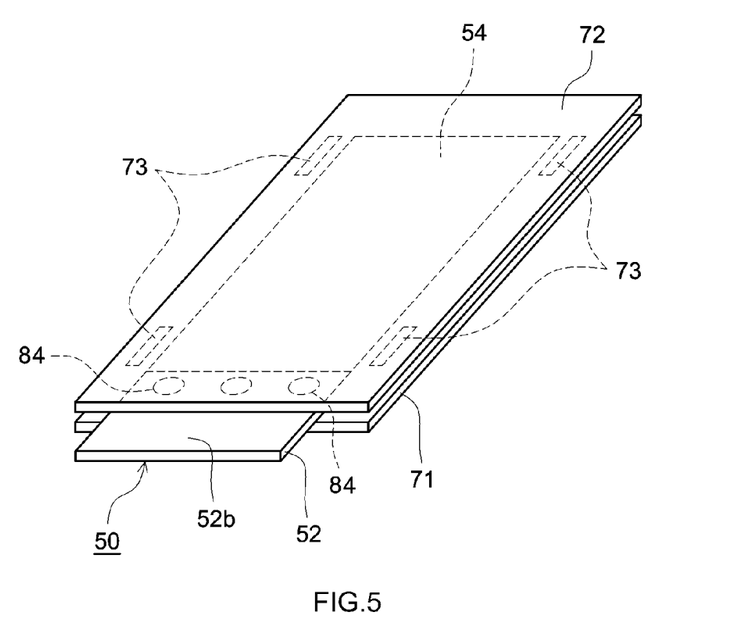
FIG. 5 is a perspective view for schematically showing a multilayer structure of a positive electrode and separators in the cell unit included in the laminated electrode body of the lithium ion secondary battery according to the embodiment of the present disclosure.

FIG. 5 shows a multilayer structure of the positive electrode 50 and the separators 71 and 72. While the separator 71 and the negative electrode active material layer 64 of the negative electrode 60 are partially bonded to each other, the separator 71 and the separator 72 are not bonded to the positive electrode active material layer 54 of the positive electrode 50. In addition, as shown in FIG. 3 and FIG. 5, the separator 71 and the separator 72 are joined to each other in an area outside the positive electrode 50. In examples shown in the drawings, the joining is performed by welding such as heat welding, ultrasonic welding, or laser welding. Consequently, in the examples shown in the drawings, joint portions 73 are formed at an interface between the separator 71 and the separator 72. The separator 71 and the separator 72 are desirably joined at least one or more places outside at least one side of an outer edge portion of the positive electrode 50 such that positional displacement of the positive electrode 50 can be prevented.

Herein, a joining method of the separator 71 and the separator 72 is not limited to the welding. The separator 71 and the separator 72 may also be bonded to each other in an area outside the positive electrode 50 by a second adhesive. Examples of the second adhesive include those described as examples of the first adhesive 80. The second adhesive may be the adhesive used as the first adhesive 80, and may also be an adhesive different from the adhesive used as the first adhesive 80.

When the negative electrode 60, the separator 71, the positive electrode 50, and the separator 72 are bonded together in the cell unit 10 as described above, the negative electrode 60, the separator 71, the positive electrode 50, and the separator 72 can be bonded and integrated together without disposing the adhesive in the positive electrode active material layer 54 serving as a main charge-discharge place and the facing area of the negative electrode active material layer 64 which faces the positive electrode active material layer 54. Therefore, with this, it is possible to prevent movement of an ion serving as a charge carrier (i.e., a lithium ion in the present embodiment) from being hindered by the adhesive in an area which is significantly related to charge and discharge of the electrode. As a result, as compared with the conventional art in which the entire surface of the separator is bonded to the entire surface of the active material layer, it is possible to reduce initial resistance. In addition, uniformity of resistance in a surface direction of the electrode is excellent. Further, in the lithium ion secondary battery 100, a required amount of the adhesive is smaller than that in the conventional art, and hence the movement of the non-aqueous electrolyte solution is less likely to be hindered by the adhesive. Therefore, while the non-aqueous electrolyte solution is pushed out of the laminated electrode body 20 by expansion of the active material layer and flows out when the lithium ion secondary battery 100 is charged and discharged repeatedly, it is possible to prevent return of the non-aqueous electrolyte solution having flowed out to the laminated electrode body 20 from being hindered by the adhesive in the lithium ion secondary battery 100. As a result, as compared with the conventional art in which the entire surface of the separator is bonded to the entire surface of the active material layer, it is possible to suppress a rise in resistance when charge and discharge are repeated. In addition, since the movement of the non-aqueous electrolyte solution is less likely to be hindered by the adhesive, it is possible to reduce time required for the non-aqueous electrolyte solution to penetrate the electrode body during manufacture of the lithium ion secondary battery 100. In addition to this, a reduction in the required amount of the adhesive is advantageous in terms of cost and the like. Further, the individual layers of the cell unit 10 are fixed by bonding and joining and the displacement of the electrode is prevented, and hence handleability is excellent and high-speed stacking is allowed.

Herein, the joint portion 73 is disposed so as to be able to prevent the positional displacement of the positive electrode 50. Specifically, the joint portions 73 are disposed outside two sides of the outer edge of the positive electrode 50 which face each other (i.e., both outer portions of the positive electrode 50 in the width direction). The separator 71 and the separator 72 are joined to each other at a total of four places. That is, the number of joint portions 73 is 4. However, the number of joint portions 73 is not limited thereto, and is, for example, not less than 2 and not more than 30, and is desirably not less than 4 and not more than 10. In addition, in the example shown in FIG. 5, the cross-sectional shape of the joint portion 73 is rectangular, but the shape of the joint portion 73 is not particularly limited. The cross-sectional shape of the joint portion 73 may also be square, circular, or oval.

In addition, the placement of the joint portion 73 is not limited to the example shown in the drawing. In the example shown in the drawing, the separator 71 and the separator 72 are joined to each other outside two sides of the outer edge of the positive electrode 50 which face each other, and hence the positional displacement of the positive electrode 50 in two directions is prevented. However, the joint portion 73 may also be provided outside an end portion of the positive electrode 50 in a length direction, which is opposite to an end portion in which the positive electrode active material layer non-formation portion 52a is formed. For example, one to three joint portions 73 may be provided in each of both outer portions of the positive electrode 50 in the width direction, and one to three joint portions 73 may be provided at the end portion of the positive electrode 50 in the length direction. In the case where the joint portions 73 are provided outside three sides of the outer edge of the positive electrode 50, it is possible to prevent the positional displacement of the positive electrode 50 in three directions.

As described above, the separator 71 and the separator 72 are joined to each other in the area outside the positive electrode 50. Therefore, the positive electrode 50 is sandwiched between the separator 71 and the separator 72, and hence the positive electrode 50 is fixed by frictional force. However, in the case where a large force is applied to the positive electrode 50, there is a possibility that the position of the positive electrode 50 may be displaced in a direction in which the joint portion 73 is not present.

On the other hand, as shown in FIG. 2, the positive electrode current collector 52 has the positive electrode active material layer non-formation portion 52a having the function as the current collector tab. In order that the positive electrode active material layer non-formation portion 52a has the function as the current collector tab, at least a part of the positive electrode active material layer non-formation portion 52a protrudes from the multilayer portion of the positive electrode active material layer 54 and the negative electrode active material layer 64. Consequently, as shown in FIG. 5, the positive electrode current collector 52 has a protrusion portion 52b which protrudes from the multilayer portion of the positive electrode active material layer 54 and the negative electrode active material layer 64.

The protrusion portion 52b may be bonded to at least one of the separator 71 and the separator 72. With this, the movement of the positive electrode 50 is prevented by a third adhesive 84, and hence it is possible to prevent the positional displacement of the positive electrode 50 described above. In the example shown in the drawing, the protrusion portion 52b and the separator 72 are bonded to each other by the third adhesive 84. The protrusion portion 52b may be bonded to the separator 71, and may also be bonded to both of the separator 71 and the separator 72.

Figure 6:
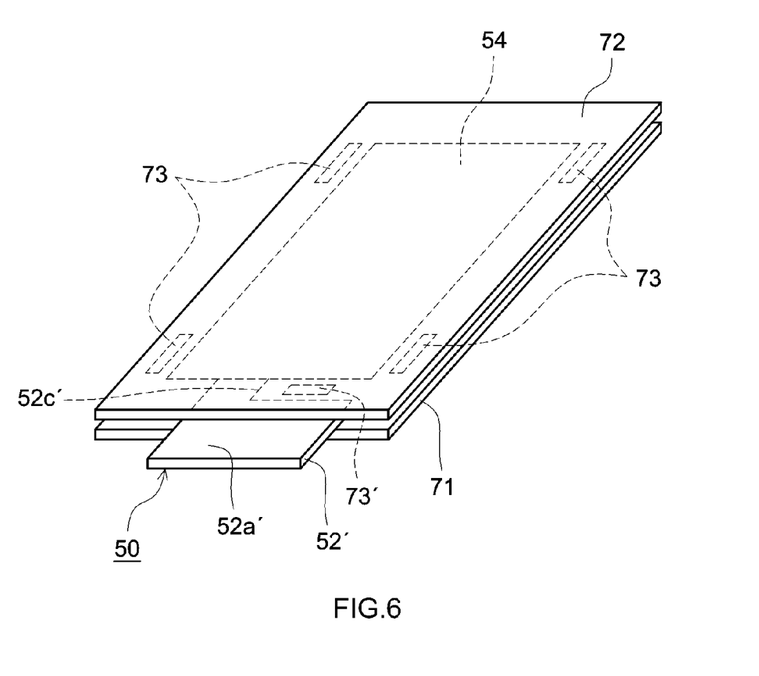
FIG. 6 is a perspective view for schematically showing the multilayer structure of the positive electrode and the separators in the cell unit included in the laminated electrode body of the lithium ion secondary battery according to a modified example of the embodiment of the present disclosure.

FIG. 6 shows a modified example of the present embodiment. Herein, in FIG. 6, the shape of a positive electrode active material layer non-formation portion 52a' of a positive electrode current collector 52' is different from that in the above-described example (see FIG. 5). Specifically, the positive electrode active material layer non-formation portion 52a' has a notch portion 52c' in the width direction (i.e., a direction perpendicular to the protrusion direction of the positive electrode active material layer non-formation portion 52a' from the positive electrode active material layer 54). At least a part of the notch portion 52c' is covered with the separator 71 and the separator 72 in the cell unit 10.

In the modified example shown in FIG. 6, in a portion in which the positive electrode active material layer non-formation portion 52a' is reduced by the notch, the separator 71 and the separator 72 are further joined to each other, and thus a joint portion 73' is further formed in this portion. The positional displacement of the positive electrode 50 can be further limited by the joint portion 73'. Accordingly, the positional displacement of the positive electrode 50 is prevented by the third adhesive 84 in the example shown in FIG. 5, but it is possible to prevent the positional displacement of the positive electrode 50 by the joint portion 73' without using the third adhesive 84 in the example shown in FIG. 6.

The first adhesive 80 has a rectangular cross-sectional shape in the example shown in FIG. 4, but the shape of the first adhesive 80 is not particularly limited. The first adhesive 80 may have a circular or oval cross-sectional shape.

It should be noted that, in the example shown in the drawing, the first adhesive 80 is disposed in the non-facing area 64b of the negative electrode active material layer 64 of the negative electrode 60. However, in the present embodiment, the placement of the first adhesive 80 is not particularly limited as long as the first adhesive 80 is disposed in an area other than the facing area 64a of the negative electrode active material layer 64 of the negative electrode 60, and the negative electrode 60 and the separator 71 are bonded to each other. For example, the first adhesive 80 may be disposed on the negative electrode current collector 62, and the negative electrode current collector 62 and the separator 71 may be bonded to each other. The first adhesive 80 may also be disposed on a side surface of the negative electrode active material layer 64, and the negative electrode active material layer 64 and the separator 71 may be bonded to each other.

In the example shown in FIG. 4, there is a portion in which the first adhesive 80 is not disposed between the first adhesive 80 and the first adhesive 80. In this portion, the non-aqueous electrolyte solution can flow. Therefore, in the example shown in the drawing, in the portion in which the first adhesive 80 is not disposed, a path through which the non-aqueous electrolyte solution flows (non-aqueous electrolyte solution flow path) 82 is formed. Thus, by providing the non-aqueous electrolyte solution flow path 82 in the non-facing area 64b of the negative electrode active material layer 64, it is possible to significantly reduce time required for the non-aqueous electrolyte solution to penetrate the electrode body during the manufacture of the non-aqueous electrolyte secondary battery.

In the case where the non-aqueous electrolyte solution flow path 82 is provided, the placement of the first adhesive 80 in the non-facing area 64b of the negative electrode active material layer 64 and the placement of the non-aqueous electrolyte solution flow path 82 in the non-facing area 64b of the negative electrode active material layer 64 are not particularly limited. In the example shown in FIG. 4, the shape of the principal surface of the negative electrode active material layer 64 is rectangular. Therefore, as shown in FIG. 4, the non-facing area 64b is a rectangular frame-shaped area constituted by two short sides and two long sides. The first adhesive 80 may be disposed in a portion of any of the sides of the rectangular frame-shaped non-facing area 64b.

Herein, a distance from the portion on the side of the long side of the negative electrode active material layer 64 to the center of the negative electrode active material layer 64 is short. Therefore, in the case where the non-aqueous electrolyte solution flow path 82 is formed in at least the portion on the side of the long side of the non-facing area 64b, an advantage is obtained in which it is easy to cause the non-aqueous electrolyte solution to penetrate to the center of the negative electrode active material layer 64.

The non-aqueous electrolyte solution flow paths 82 are desirably disposed in portions of two or more sides of the rectangular frame-shaped non-facing area 64b, are desirably disposed in portions of three or more sides thereof, and are desirably disposed in portions of all four sides thereof.

In the example shown in the drawing, one non-aqueous electrolyte solution flow path 82 is formed in the portion on the side of the short side of the non-facing area 64b, and two non-aqueous electrolyte solution flow paths 82 are formed in the portion on the side of the long side of the non-facing area 64b. However, the number of non-aqueous electrolyte solution flow paths 82 disposed at one side of the non-facing area 64b is not particularly limited. The number of non-aqueous electrolyte solution flow paths 82 only needs to be one or more.

As shown in FIG. 4, the non-facing area 64b is the rectangular frame-shaped area, and hence the first adhesive 80 is disposed along the sides of the principal surface of the negative electrode active material layer 64. The dimensions of the non-aqueous electrolyte solution flow path 82 are not particularly limited as long as the non-aqueous electrolyte solution can flow. In the case where the total of the dimensions of the non-aqueous electrolyte solution flow paths 82 in a side direction of the principal surface of the negative electrode active material layer 64 (e.g., in the case of FIG. 4, the total of a length W1 and a length W2 in a long side direction) is not less than 10% of the length of the side of the principal surface of the negative electrode active material layer 64 (e.g., in the case of FIG. 4, a length L of the long side), an advantage is obtained in which the non-aqueous electrolyte solution penetrates the non-facing area 64a of the negative electrode active material layer 64 particularly easily. The total of the dimensions of the non-aqueous electrolyte solution flow path 82 in the side direction of the principal surface of the negative electrode active material layer 64 is desirably not less than 30% of the length of the side of the principal surface of the negative electrode active material layer 64, more desirably not less than 50% thereof, further desirably not less than 70% thereof, and most desirably not less than 90% thereof.

In addition, as shown in FIG. 3, the thickness of the first adhesive 80 disposed in the non-facing area 64b of the negative electrode active material layer 64 (i.e., the dimension of the first adhesive 80 in the stacking direction of the positive electrode 50 and the negative electrode 60) may be made smaller than the thickness of the positive electrode 50 (i.e., the dimension of the positive electrode 50 in the stacking direction of the positive electrode 50 and the negative electrode 60).

In the case where the thickness of the first adhesive 80 is larger than the thickness of the positive electrode 50, a portion having the first adhesive 80 protrudes in the cell unit 10. Consequently, in the case where a pressure is applied to the laminated electrode body 20 in which such cell units 10 are stacked in its stacking direction, the pressure is concentrated on the first adhesive 80. When the pressure is concentrated, there is a possibility that a problem such as deformation of the negative electrode 60 or damage to the negative electrode active material layer 64 may occur. Accordingly, in the case where the thickness of the first adhesive 80 is smaller than the thickness of the positive electrode 50, the portion having the first adhesive 80 does not protrude in the cell unit 10, and hence it is possible to prevent the problem caused by the concentration of the pressure.

The cell unit 10 can be fabricated, for example, in the following manner. First, the positive electrode 50, the negative electrode 60, the separator 71, and the separator 72 are prepared. Next, the separator 71, the positive electrode 50, and the separator 72 are stacked, and the separator 71 and the separator 72 are joined to each other. Next, the first adhesive 80 is applied to the non-facing area 64b of the negative electrode active material layer 64 of the negative electrode 60, and the non-facing area 64b thereof is bonded to the separator 71.

Specifically, the positive electrode 50 in which the positive electrode active material layers 54 are provided on both surfaces of the positive electrode current collector 52 is fabricated according to an ordinary method. On the other hand, the negative electrode 60 in which the negative electrode active material layers 64 are provided on both surfaces of the negative electrode current collector 62 is fabricated according to an ordinary method. It should be noted that the positive electrode active material layer non-formation portion 52a in which the positive electrode current collector 52 is exposed is provided in the positive electrode 50, and the negative electrode active material layer non-formation portion 62a in which the negative electrode current collector 62 is exposed is provided in the negative electrode 60. Two separators having no adhesive layer are prepared as the separator 71 and the separator 72.

The positive electrode 50 is stacked so as to be sandwiched between the separator 71 and the separator 72. At this point, in order to prevent the positional displacement of the positive electrode 50, the third adhesive may be applied to the positive electrode active material layer non-formation portion 52a of the positive electrode 50, and at least one of the separator 71 and the separator 72 may be bonded to the positive electrode 50.

Each of the area of the principal surface of the separator 71 and the area of the principal surface of the separator 72 is larger than the area of the principal surface of the positive electrode active material layer 54, and hence the separator 71 and the separator 72 directly overlap each other in a portion outside the positive electrode 50. In the portion outside the positive electrode 50, the separator 71 and the separator 72 are welded to each other by heat welding, ultrasonic welding, or laser welding. Alternatively, in the portion outside the positive electrode 50, the separator 71 and the separator 72 are bonded to each other by the second adhesive.

The first adhesive 80 is applied to the non-facing area 64b of one of the negative electrode active material layers 64 of the negative electrode 60. An application method is not particularly limited and, the non-facing area 64b of the negative electrode active material layer 64 is very small, and hence it is advantageous to perform the application of the first adhesive 80 by using a piezo-driven liquid jet dispenser or the like.

The separator 71 and the negative electrode active material layer 64 to which the first adhesive 80 is applied are stacked such that the positive electrode active material layer 54 and the central portion of the negative electrode active material layer 64 face each other, and bonding is performed. The bonding is appropriately performed according to the type of the first adhesive 80. For example, in the case where the first adhesive 80 is a hot melt adhesive, the hot melt adhesive is cooled and solidified. For example, in the case where the first adhesive 80 is an ultraviolet-curing adhesive, the ultraviolet-curing adhesive is irradiated with ultraviolet rays and is cured. For example, in the case where the first adhesive 80 is a thermosetting adhesive, the thermosetting adhesive is heated and cured.

In the present embodiment, a plurality of the above-described cell units 10 are stacked. In the cell unit 10, the negative electrode 60 is bonded to the separator 71 and the positive electrode 50 is bonded to the separator 71 and the separator 72, and hence they are integrated together. By using such a cell unit 10, it becomes possible to perform high-speed stacking when the laminated electrode body 20 is fabricated.

Two adjacent cell units 10 may or may not be bonded to each other. In the case where the two adjacent cell units 10 are bonded to each other, the negative electrode 60 of one of the cell units 10 is bonded to the separator 72 of the other of the cell units 10. In this case, an advantage is obtained in which a misalignment between the cell units 10 becomes less likely to occur.

In the case where the two adjacent cell units 10 are bonded to each other, the negative electrode 60 of one of the cell units 10 and the positive electrode 50 of the other of the cell units 10 face each other. That is, the negative electrode active material layer 64 of the negative electrode 60 of one of the cell units 10 and the positive electrode active material layer 54 of the other of the cell units 10 face each other. At this point, it is desirable to bond the negative electrode 60 of one of the cell units 10 to the separator 72 of the other of the cell units 10 by using the same mode as the bonding mode of the negative electrode 60 and the separator 71 in the cell unit 10.

Specifically, it is desirable that the facing area which faces the positive electrode active material layer 54 of the other of the cell units 10 be formed in the central portion of the negative electrode active material layer 64 of the negative electrode 60 of one of the cell units 10, and the non-facing area which does not face the positive electrode active material layer 54 of the other of the cell units 10 be formed in the outer peripheral edge portion of the negative electrode active material layer 64 of the negative electrode 60 of one of the cell units 10. In addition, similarly to the above description, it is desirable that the fourth adhesive which bonds the two adjacent cell units 10 together not be disposed in the facing area 64a of the negative electrode active material layer 64 and be disposed in an area (especially the non-facing area 64b) other than the facing area 64a, the fourth adhesive not be disposed in at least a part of the non-facing area 64b, and the path through which the non-aqueous electrolyte solution flows be formed. At this point, penetrability of the non-aqueous electrolyte solution into the laminated electrode body 20 during manufacture is more excellent while the misalignment between the cell units is prevented. In addition, uniformity of resistance in the surface direction of the electrode is more excellent.

Examples of the fourth adhesive include those described as examples of the first adhesive. The fourth adhesive may be the adhesive used as the first adhesive, and may also be an adhesive different from the adhesive used as the first adhesive.

In the present embodiment, the laminated electrode body 20 is constituted by a multilayer body of a plurality of the cell units 10. Specifically, the laminated electrode body 20 is constituted by the multilayer body in which a plurality of the cell units 10 are stacked such that, in two adjacent cell units 10, the negative electrode 60 of one of the cell units 10 and the positive electrode 50 of the other of the cell units 10 face each other. In this multilayer body, one of outermost layers is the positive electrode 50, and the other outermost layer is the negative electrode 60. In addition to the multilayer body, the laminated electrode body 20 may further include a single negative electrode, and the single negative electrode may be stacked on the positive electrode 50 which is the outermost layer of the multilayer body. At this point, it is possible to use lithium in the positive electrode 50 which is the outermost layer for charge and discharge, and it is possible to improve cell capacity.

As the non-aqueous electrolyte solution, it is possible to use the same non-aqueous electrolyte solution as that used in a known lithium ion secondary battery. The non-aqueous electrolyte solution typically contains a non-aqueous solvent and a supporting electrolyte (i.e., an electrolyte salt). As the non-aqueous solvent, it is possible to use organic solvents such as various carbonates, ethers, esters, nitriles, sulfones, and lactones which are used in the non-aqueous electrolyte solution of the known lithium ion secondary battery without particular limitation and, among them, carbonates are desirable. Examples of the carbonates include ethylene carbonate (EC), propylene carbonate (PC), diethyl carbonate (DEC), dimethyl carbonate (DMC), ethylmethyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). The non-aqueous solvent can be used alone or in combination with two or more non-aqueous solvents appropriately. As the supporting electrolyte, for example, a lithium salt such as $LiPF_6$, $LiBF_4$, or $LiClO_4$ (desirably $LiPF_6$) can be suitably used. The concentration of the supporting electrolyte is desirably not less than 0.7 mol/L and not more than 1.3 mol/L.

The non-aqueous electrolyte solution may contain components other than the above-described components, for example, various additives such as a gas generating agent such as biphenyl (BP) or cyclohexylbenzene (CHB); and a thickening agent as long as the effect of the present disclosure is not significantly spoiled.

In the lithium ion secondary battery 100, initial resistance is low, and an increase in resistance when charge and discharge are repeated is suppressed. That is, the lithium ion secondary battery 100 has excellent resistance properties. In addition, the lithium ion secondary battery 100 has excellent penetrability of the non-aqueous electrolyte solution into the laminated electrode body 20 during manufacture.

The lithium ion secondary battery 100 can be used for various applications. An example of the suitable applications includes a drive power source mounted in vehicles such as an electric vehicle (EV), a hybrid vehicle (HV), and a plug-in hybrid vehicle (PHV). In addition, the lithium ion secondary battery 100 can be used as a storage battery of a small electricity storage apparatus. The lithium ion secondary battery 100 can also be used in the form of a battery pack in which, typically, a plurality of lithium ion secondary batteries are connected in series and/or parallel.

The present embodiment has been described thus far by using the lithium ion secondary battery as an example. However, the technique disclosed herein relates to bonding and joining structures in the cell unit 10, and hence it is to be understood that the technique can also be applied to the non-aqueous electrolyte secondary battery which uses an ion other than the lithium ion as a charge carrier.

In the present embodiment, the first electrode having the large area of the principal surface of the active material layer is the negative electrode, and the second electrode is the positive electrode. However, in the technique disclosed herein, the first electrode may be the positive electrode, and the second electrode may be the negative electrode.

Hereinbelow, examples related to the present disclosure will be described in detail, but it is not intended to limit the present disclosure to such examples.

Fabrication of Lithium Ion Secondary Battery for Evaluation

Example 1

A positive electrode which included positive electrode active material layers containing $LiNi_{0.8}Co_{0.1}Mn_{0.1}O_2$ on both surfaces of aluminum foil having a thickness of 13 μm was prepared. The dimensions of the principal surface of the positive electrode active material layer were 300 mm×100 mm, and the thickness of the positive electrode active material layer was 135 μm. In addition, a negative electrode which included negative electrode active material layers containing natural graphite on both surfaces of copper foil having a thickness of 8 μm was prepared. The dimensions of the principal surface of the negative electrode active material layer were 302 mm×102 mm, and the thickness of the negative electrode active material layer was 170 μm. A positive electrode active material layer non-formation portion in which the aluminum foil was exposed was provided in the positive electrode, and a negative electrode active material layer non-formation portion in which the copper foil was exposed was provided in the negative electrode.

Two single-layer polypropylene porous films were prepared as separators. The dimensions of the principal surface of the separator were 306 mm×104 mm, the thickness of the separator was 20 μm, and the air permeability of the separator was 170 seconds/100 mL.

In the positive electrode active material layer non-formation portion (i.e., the exposed aluminum foil), a hot melt adhesive "Hi-Bon ZH234-1" (manufactured by Hitachi Chemical Company, Ltd.) was applied to six places as minute dots each having a diameter of 0.5 mm by using a piezo-driven coating gun. The positive electrode was sandwiched between the two separators, pressurization was performed for one minute at a pressure of 0.5 MPa at 90° C., and bonding was thereby performed. Further, outside end portions of the positive electrode in a width direction, the two separators were joined to each other by ultrasonic welding.

The hot melt adhesive "Hi-Bon ZH234-1" (manufactured by Hitachi Chemical Company, Ltd.) was applied to an area of the principal surface of the negative electrode active material layer of the negative electrode, which did not face the positive electrode active material layer. The hot melt adhesive was applied to six places as minute dots each having a diameter of 0.5 mm. As application positions, four corner portions of the area which did not face the positive electrode active material layer and central portions of two long sides of the area were selected.

The separators between which the positive electrode was sandwiched and the negative electrode were stacked, pressurization was performed for one minute at a pressure of 0.5 MPa at 90° C., bonding with the hot melt adhesive was performed, and a cell unit was thereby fabricated. After 90 cell units were fabricated, the 90 cell units were stacked, and a laminated electrode body was thereby obtained.

A non-aqueous electrolyte solution was prepared by dissolving $LiPF_6$ serving as a supporting electrolyte in a mixed solvent containing ethylene carbonate (EC), ethylmethyl carbonate (EMC), and dimethyl carbonate (DMC) at a volume ratio of 3:4:3, at a concentration of 1.1 mol/L.

A tab lead was attached to the laminated electrode body by ultrasonic joining, and the laminated electrode body was accommodated in an aluminum laminate case. The above-described non-aqueous electrolyte solution was injected into the laminate case, and the laminate case was sealed by a vacuum seal. After the laminate case was left to stand for 24 hours, a pressure of 2 MPa was applied to the laminate case, and the laminate case was subjected to constant current charge (pre-charge) with a current value of 0.2 C until 2.75 V was reached. Gas was removed by cutting part of the laminate case in a vacuum, and the laminate case was sealed again.

After a pressure of 1 MPa was applied to the resultant and the resultant was subjected to constant current charge with a current value of 0.3 C until 4.25 V was reached, the resultant was subjected to constant voltage charge with a voltage of 4.25 V with a cutoff current value set to 1.5 A, and a lithium ion secondary battery for evaluation with an SOC of 100% was thereby fabricated.

Reference 1

A positive electrode and a negative electrode identical to those in Example 1 were prepared. In addition, two separators identical to those in Example 1 (i.e., the single-layer polypropylene porous film; the dimensions of the principal surface thereof were 306 mm×104 mm, the thickness thereof was 20 μm, the air permeability thereof was 170 seconds/100 mL) were prepared.

The positive electrode was sandwiched between the two separators. The separators between which the positive electrode was sandwiched and the negative electrode were stacked, and a cell unit was thereby fabricated. After 90 cell units were fabricated, the 90 cell units were stacked, and a laminated electrode body was thereby obtained. By using the laminated electrode body, a lithium ion secondary battery for evaluation was fabricated in the same manner as in Example 1.

Comparative Example 1

A positive electrode and a negative electrode identical to those in Example 1 were prepared. In addition, two polypropylene porous films each having adhesive layers containing alumina and polyvinylidene fluoride on both surfaces were prepared as separators. The dimensions of the principal surface of the separator were 306 mm×104 mm, the thickness of the separator was 20 μm (adhesive layer 2 μm+base material 16 μm+adhesive layer 2 μm), and the air permeability thereof was 170 seconds/100 mL.

The positive electrode was sandwiched between the two separators. The separators between which the positive electrode was sandwiched and the negative electrode were stacked, pressurization was performed for one minute at a pressure of 0.5 MPa at 90° C., the two separators were bonded to the positive electrode and one of the separators was bonded to the negative electrode, and a cell unit was thereby fabricated. After 90 cell units were fabricated, the 90 cell units are stacked, and a laminated electrode body was thereby obtained. By using the laminated electrode body, a lithium ion secondary battery for evaluation was fabricated in the same manner as in Example 1.

Comparative Example 2

A positive electrode and a negative electrode identical to those in Example 1 were prepared. In addition, two polypropylene porous films each having an adhesive layer containing alumina and polyvinylidene fluoride on one surface were prepared as separators. The dimensions of the principal surface of the separator were 306 mm×104 mm, the thickness of the separator was 20 μm (base material 16 μm+adhesive layer 2 μm), and the air permeability thereof was 170 seconds/100 mL.

The positive electrode was sandwiched between the two separators such that the adhesive layer of each separator faces the positive electrode. The separators between which the positive electrode was sandwiched and the negative electrode were stacked, pressurization was performed for one minute at a pressure of 0.5 MPa at 90° C., the two separators were bonded to the positive electrode, and a cell unit was thereby fabricated. After 90 cell units were fabricated, the 90 cell units were stacked, and a laminated electrode body was thereby obtained. By using the laminated electrode body, a lithium ion secondary battery for evaluation was fabricated in the same manner as in Example 1.

Evaluation of Initial Resistance Properties

A pressure of 1 MPa was applied to each lithium ion secondary battery for evaluation in a temperature environment of 25° C., and the SOC of the lithium ion secondary battery was adjusted to an SOC of 50%. Thereafter, constant current discharge was performed with a current value of 2 C for 10 seconds. A voltage change amount at this point was determined, and an initial resistance value was calculated from the voltage change amount and the current value. The result is shown in Table 1.

Evaluation of Resistance Properties after Change-Discharge Cycle

A pressure of 1 MPa was applied to each lithium ion secondary battery for evaluation in a temperature environment of 25° C. A Charge-discharge cycle including constant current charge from 2.5 V to 4.25 V with 1 C and constant current discharge from 4.25 V to 2.5 V with 1 C was repeated 100 times on the lithium ion secondary battery. It should be noted that relaxation time between charge-discharge cycles was 10 minutes. Thereafter, similarly to the initial resistance, the resistance value was determined. The result is shown in Table 1.

TABLE 1

| | Bonding mode | | Resistance | |
| --- | --- | --- | --- | --- |
| | Separator-positive electrode | Separator-negative electrode | Initial resistance (mΩ) | after 100 cycles (mΩ) |
| Reference 1 | Not bonded | Not bonded | 0.88 | 0.93 |
| Comparative Example 1 | Surface bonding | Surface bonding | 0.97 | 1.26 |
| Comparative Example 2 | Surface bonding | Not bonded | 0.94 | 1.03 |
| Example 1 | Bonded in positive electrode current collector outside active material layer | Bonded in non-facing area of active material layer | 0.88 | 0.93 |

From a comparison among Reference 1, Comparative Example 1, and Comparative Example 2, it can be seen that resistance properties are caused to deteriorate by bonding the separator to the electrode. In particular, from a comparison between Comparative Example 1 and Comparative Example 2, it can be seen that, when a portion in which the adhesive is used is increased in size, the resistance properties more deteriorate.

However, in Example 1 in which the adhesive was not used in the positive electrode active material layer and the area of the negative electrode active material layer which faced the positive electrode active material layer, the resistance properties similar to those in Reference 1 in which the adhesive was not used at all were exhibited irrespective of the use of the adhesive in part of the cell unit. Accordingly, it can be seen that, in Example 1, the lithium ion secondary battery having excellent resistance properties is obtained irrespective of the use of the adhesive for preventing the positional displacement.

Further, the present inventors fabricated a lithium ion secondary battery in the same manner as in Example 1 except that the adhesive was not used in the positive electrode active material layer non-formation portion. In this lithium ion secondary battery, the separator and the positive electrode were not bonded to each other, and the negative electrode and the separator were bonded to each other in the non-facing area of the negative electrode active material layer. It was confirmed that the positive electrode was fixed by the frictional force of the separator and the positive electrode, whereby, even when the separator and the positive electrode were not bonded to each other, it was possible to perform normal stacking operations without causing the positional displacement of the positive electrode. In addition, it was determined that this lithium ion secondary battery also had the resistance properties similar to those in Reference 1.

Accordingly, from the foregoing, it can be seen that according to the non-aqueous electrolyte secondary battery disclosed herein, the resistance properties are excellent, and the penetrability of the non-aqueous electrolyte solution into the laminated electrode body during manufacture is excellent.

While the specific examples of the present disclosure have been described in detail thus far, the specific examples are only illustrative, and are not intended to limit the scope of claims. The technique described in the scope of claims encompasses various modifications and changes to the specific examples described above.

What is claimed is:

1. A non-aqueous electrolyte secondary battery comprising:
a laminated electrode body in which two or more cell units, in each of which a first electrode, a first separator, a second electrode, and a second separator are stacked in this order, are stacked; and
a non-aqueous electrolyte solution, wherein
the first electrode has a first current collector and a first active material layer,
the second electrode has a second current collector and a second active material layer,
an area of a principal surface of the first active material layer of the first electrode is larger than an area of a principal surface of the second active material layer of the second electrode,
each of an area of a principal surface of the first separator and an area of a principal surface of the second separator is larger than the area of the principal surface of the second active material layer of the second electrode,
the first active material layer includes a facing area which faces the second active material layer formed in a central portion of the first active material layer, and a non-facing area which does not face the second active material layer formed in an outer peripheral edge portion of the first active material layer, the first separator and the first electrode are bonded to each other by a first adhesive, the first adhesive which bonds the first electrode to the first separator is not disposed in the facing area of the first active material layer and is disposed in the non-facing area of the first active material layer, the first separator and the second separator are not bonded to the second active material layer of the second electrode, and the first separator and the second separator are joined to each other outside the second electrode.

2. The non-aqueous electrolyte secondary battery according to claim 1, wherein the first electrode is a negative electrode, and the second electrode is a positive electrode.

3. The non-aqueous electrolyte secondary battery according to claim 1, wherein the second current collector has a protrusion portion which protrudes from a multilayer portion of the first active material layer and the second active material layer, and the protrusion portion is bonded to at least one of the first separator and the second separator.

4. The non-aqueous electrolyte secondary battery according to claim 1, wherein in at least a part of the non-facing area in the outer peripheral edge portion of the first active material layer, the first adhesive is not disposed, and a path through which the non-aqueous electrolyte solution flows is formed.

5. The non-aqueous electrolyte secondary battery according to claim 1, wherein a thickness of the first adhesive is smaller than a thickness of the second electrode.

6. The non-aqueous electrolyte secondary battery according to claim 1, wherein, in two of the cell units which are positioned adjacent to each other, the first electrode of one of the cell units and the second separator of the other of the cell units are bonded to each other.

7. The non-aqueous electrolyte secondary battery according to claim 6, wherein a facing area which faces the second active material layer of the second electrode of the other of the cell units is formed in a central portion of the first active material layer of the first electrode of the one of the cell units, a non-facing area which does not face the second active material layer of the second electrode of the other of the cell units is formed in an outer peripheral edge portion of the first active material layer of the first electrode of the one of the cell units, the first electrode of the one of the cell units and the second separator of the other of the cell units are bonded to each other by a third adhesive, the third adhesive is not disposed in the facing area of the first active material layer of the first electrode of the one of the cell units and is disposed in an area other than the facing area, and in at least a part of the non-facing area, the third adhesive is not disposed and a path through which the non-aqueous electrolyte solution flows is formed.

8. The non-aqueous electrolyte secondary battery according to claim 1, wherein the laminated electrode body includes a multilayer body in which a plurality of the cell units are stacked and of which outermost layers are a positive electrode and a negative electrode, and a single negative electrode, and the single negative electrode is stacked on the positive electrode which is the outermost layer of the multilayer body.

* * * * *